US007400684B2

(12) United States Patent
Hannuksela et al.

(10) Patent No.: US 7,400,684 B2
(45) Date of Patent: Jul. 15, 2008

(54) VIDEO CODING

(75) Inventors: Miska Hannuksela, Tampere (FI); Kerem Caglar, Tampere (FI)

(73) Assignee: Nokia Corporation, Espoo (FI)

( * ) Notice: Subject to any disclaimer, the term of this patent is extended or adjusted under 35 U.S.C. 154(b) by 572 days.

(21) Appl. No.: 09/854,463

(22) Filed: May 15, 2001

(65) Prior Publication Data

US 2001/0040926 A1 Nov. 15, 2001

(30) Foreign Application Priority Data

May 15, 2000 (GB) .................................. 0011639

(51) Int. Cl.
  H04N 7/12 (2006.01)
  H04N 11/02 (2006.01)
(52) U.S. Cl. ................................. 375/240.27
(58) Field of Classification Search ............ 375/240.27, 375/240.01, 240.13, 240.25; 386/117; 382/232; 348/14.01, 14.02
See application file for complete search history.

(56) References Cited

U.S. PATENT DOCUMENTS

| | | | |
|---|---|---|---|
| 4,875,094 A | 10/1989 | Haghiri et al. | |
| 4,972,261 A | 11/1990 | Whalley | |
| 5,410,553 A * | 4/1995 | Choon | 714/747 |
| 5,436,664 A | 7/1995 | Henry | |
| 5,727,088 A | 3/1998 | Kim | |
| 5,978,509 A | 11/1999 | Nachtergaele et al. | |
| 6,188,792 B1 * | 2/2001 | Chujoh et al. | 382/236 |
| 6,351,493 B1 * | 2/2002 | Reed et al. | 375/240.13 |
| 6,438,165 B2 | 8/2002 | Normile | |
| 6,515,695 B1 * | 2/2003 | Sato et al. | 348/14.08 |
| 6,636,565 B1 * | 10/2003 | Kim | 375/240.27 |
| 6,661,927 B1 * | 12/2003 | Suarez et al. | 382/240 |
| 6,714,724 B1 * | 3/2004 | Cook | 386/117 |

FOREIGN PATENT DOCUMENTS

| | | |
|---|---|---|
| EP | 0637027 A2 | 2/1994 |
| EP | 0602817 | 6/1994 |
| EP | 0637027 | 2/1995 |
| EP | 0637027 A2 | 2/1995 |

(Continued)

OTHER PUBLICATIONS

ITU-Telecommunications Standardization Sector, Ninth Meeting: Red Bank, NJ, 19-22 Oct.,1999 p. 1-2.

(Continued)

*Primary Examiner*—Gims Philippe
*Assistant Examiner*—Erick Rekstad
(74) *Attorney, Agent, or Firm*—Foley & Lardner LLP

(57) ABSTRACT

A method of encoding a video signal representing a sequence of pictures, the method comprising comparing a first picture with a second picture, calculating a measure of the similarity between the first and the second pictures, comparing the measure of similarity with a predetermined criterion of similarity and, when the measure of similarity does not meet the predetermined criterion of similarity, outputting an indicator indicating that a non-temporally predictive error concealment method should be used by a subsequent decoder and, when the measure of similarity meets the predetermined criterion of similarity, outputting an indicator indicating that a temporally predictive error concealment method should be used by a subsequent decoder.

60 Claims, 4 Drawing Sheets

FOREIGN PATENT DOCUMENTS

| | | |
|---|---|---|
| EP | 0702492 A1 | 3/1996 |
| GB | 2320836 | 7/1998 |
| GB | 2326300 | 12/1998 |
| GB | 2331886 | 2/1999 |
| GB | 2349032 A | 10/2000 |
| JP | 69-22300 | 1/1994 |
| JP | 6022300 | 1/1994 |
| WO | WO 98/23085 A1 | 5/1998 |
| WO | WO 98/39891 | 9/1998 |
| WO | WO 99/04573 | 1/1999 |
| WO | WO 99/25122 | 5/1999 |
| WO | WO 99/43163 | 8/1999 |

OTHER PUBLICATIONS

ITU-Telecommunications Standardization Sector, Seventh Meeting: Feb. 15-19, 1999, Monterey,CA, USA pp. 1-11.

"Error Concealment in Encoded Video Streams" by SALMA, et al pp. 1-32.

"Professor Delp's Recent Publications" Recent Pub. of Edward J. Delp.

"Picture Layer" 5.1 Recommendation H.263 (Feb. 1998).

"Error Control and Concealment for Video Communication: A Review" pp. 974-997.

ITU-Telecommunications Standardization Sector, Ninth Meeting: Red Bank, New Jersey, Oct., 19-22, 1999 p. 1.

ITU-Telecommunications Standardization Sector, Ninth Meeting: Red Bank, New Jersey, Oct., 19-22, 1999, pp 1-3.

ITU-Telecommunications Standardization Sector, Ninth Meeting: Red Bank, New Jersey, Oct., 19-22, 1999 p. 1-2.

ITU-Telecommunications Standardization Sector, Ninth Meeting: Red Bank, New Jersey, Oct.,19-22, 1999 pp. 1-2.

ITU-Telecommunications Standardization Sector, Ninth Meeting: Red Bank, New Jersey, Oct., 19-22, 1999.

ITU-Telecommunications Standardization Sector, Nov., 1999, pp. 1-43.

Kharatichvili, M. et al , "Concealment Techniques for Data-Reduced HDTV Recording." Signal Processing: Image Communication 7 (1995) pp. 173-182, Apr. 11, 1994.

* cited by examiner

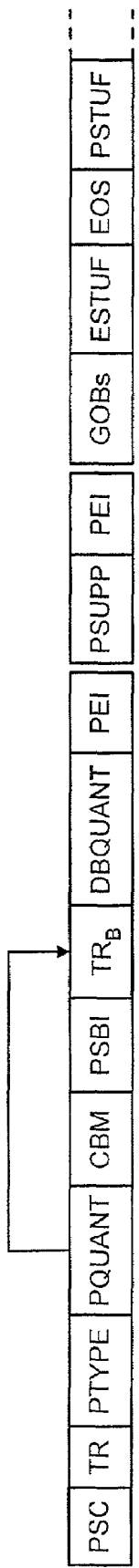
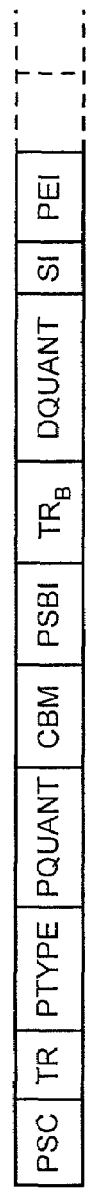
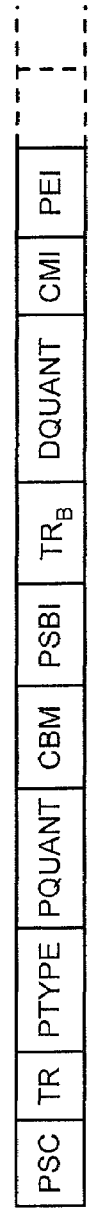
FIG.4
FIG.5a
FIG.5b

FIG.6a

| PSC | TR | PTYPE | PQUANT | CBM | PSBI | TR$_B$ | DQUANT | PEI | PSUPP | PEI | PSUPP | PEI | ... |

Expansion of PSUPP:
| FTYPE = SI | DSIZE = 1 | PARAMETER DATA = SI VALUE |

FIG.6b

| PSC | TR | PTYPE | PQUANT | CBM | PSBI | TR$_B$ | DQUANT | PEI | PSUPP | PEI | PSUPP | PEI | ... |

Expansion of PSUPP:
| FTYPE = CMI | DSIZE = 1 | PARAMETER DATA = CMI VALUE |

FIG.7

| PSC | TR | PTYPE | PQUANT | CBM | PSBI | TR$_B$ | DQUANT | PEI | PSUPP | PEI | PSUPP | PEI | ... |

Expansion of PSUPP:
| FTYPE = Picture Message | CONT | EBIT | MTYPE |

VIDEO CODING

BACKGROUND OF THE INVENTION

This invention relates to video coding and in particular to concealing artefacts introduced by errors.

A video sequence consists of a series of still pictures or frames. Video compression methods are based on reducing the redundant and perceptually irrelevant parts of video sequences. The redundancy in video sequences can be categorized into spectral, spatial and temporal redundancy. Spectral redundancy refers to the similarity between the different colour components of the same picture. Spatial redundancy results from the similarity between neighbouring pixels in a picture. Temporal redundancy exists because objects appearing in a previous image are also likely to appear in the current image. Compression can be achieved by taking advantage of this temporal redundancy and predicting the current picture from another picture, termed an anchor or reference picture. Further compression is achieved by generating motion compensation data that describes the motion between the current picture and the reference picture.

However, sufficient compression cannot usually be achieved by only reducing the inherent redundancy of the sequence. Thus, video encoders also try to reduce the quality of those parts of the video sequence which are subjectively less important. In addition, the redundancy of the encoded bit-stream is reduced by means of efficient lossless coding of compression parameters and coefficients. The main technique is to use variable length codes.

Video compression methods typically differentiate between pictures that utilise temporal redundancy reduction and those that do not. Compressed pictures that do not utilise temporal redundancy reduction methods are usually called INTRA or I-frames or I-pictures. Temporally predicted images are usually forwardly predicted from a picture occurring before the current picture and are called INTER or P-frames. In the INTER frame case, the predicted motion-compensated picture is rarely precise enough and therefore a spatially compressed prediction error frame is associated with each INTER frame. INTER pictures may contain INTRA-coded areas.

Many video compression schemes also use temporally bi-directionally predicted frames, which are commonly referred to as B-pictures or B-frames. B-pictures are inserted between anchor picture pairs of I- and/or P-frames and are predicted from either one or both of these anchor pictures. B-pictures normally yield increased compression as compared with forward-predicted pictures. B-pictures are not used as anchor pictures, i.e., other pictures are not predicted from them. Therefore they can be discarded (intentionally or unintentionally) without impacting the picture quality of future pictures. Whilst B-pictures may improve compression performance as compared with P-pictures, their generation requires greater computational complexity and memory usage, and they introduce additional delays. This may not be a problem for non-real time encoding such as video streaming but may cause problems in real-time applications such as video-conferencing.

A compressed video clip typically consists of a sequence of pictures, which can be roughly categorized into temporally independent INTRA pictures and temporally differentially coded INTER pictures. Since the compression efficiency in INTRA pictures is normally lower than in INTER pictures, INTRA pictures are used sparingly, especially in low bit-rate applications.

A video sequence may consist of a number of scenes or shots. The picture contents may be remarkably different from one scene to another, and therefore the first picture of a scene is typically INTRA-coded. There are frequent scene changes in television and film material, whereas scene cuts are relatively rare in video conferencing. In addition, INTRA pictures are typically inserted to stop temporal propagation of transmission errors in a reconstructed video signal and to provide random access points to a video bit-stream.

Compressed video is easily corrupted by transmission errors, mainly for two reasons. Firstly, due to utilisation of temporal predictive differential coding (INTER frames), an error is propagated both spatially and temporally. In practice this means that, once an error occurs, it is easily visible to the human eye for a relatively long time. Especially susceptible are transmissions at low bit-rates where there are only a few INTRA-coded frames, so temporal error propagation is not stopped for some time. Secondly, the use of variable length codes increases the susceptibility to errors. When a bit error alters the codeword, the decoder will lose codeword synchronisation and also decode subsequent error-free codewords (comprising several bits) incorrectly until the next synchronisation (or start) code. A synchronisation code is a bit pattern which cannot be generated from any legal combination of other codewords and such codes are added to the bit stream at intervals to enable resynchronisation. In addition, errors occur when data is lost during transmission. For example, in video applications using the unreliable UDP transport protocol in IP networks, network elements may discard parts of the encoded video bit-stream.

There are many ways for the receiver to address the corruption introduced in the transmission path. In general, on receipt of a signal, transmission errors are first detected and then corrected or concealed by the receiver. Error correction refers to the process of recovering the erroneous data perfectly as if no errors had been introduced in the first place. Error concealment refers to the process of concealing the effects of transmission errors so that they are hardly visible in the reconstructed video sequence. Typically some amount of redundancy is added by the source or transport coding in order to help error detection, correction and concealment. Error concealment techniques can be roughly classified into three categories: forward error concealment, error concealment by post-processing and interactive error concealment. The term "forward error concealment" refers to those techniques in which the transmitter side adds redundancy to the transmitted data to enhance the error resilience of the encoded data. Error concealment by post-processing refers to operations at the decoder in response to characteristics of the received signals. These methods estimate the correct representation of erroneously received data. In interactive error concealment, the transmitter and receiver co-operate in order to minimize the effect of transmission errors. These methods heavily utilise feedback information provided by the receiver. Error concealment by post-processing can also be referred to as passive error concealment whereas the other two categories represent forms of active error concealment.

There are numerous known concealment algorithms, a review of which is given by Y. Wang and Q.-F. Zhu in "Error Control and Concealment for Video Communication: A Review", Proceedings of the IEEE, Vol. 86, No. 5, May 1998, pp. 974–997 and an article by P. Salama, N. B. Shroff, and E. J. Delp, "Error Concealment in Encoded Video," submitted to IEEE Journal on Selected Areas in Communications.

Current video coding standards define a syntax for a self-sufficient video bit-stream. The most popular standards at the time of writing are ITU-T Recommendation H.263, "Video coding for low bit rate communication", February 1998; ISO/IEC 14496-2, "Generic Coding of Audio-Visual Objects. Part 2: Visual", 1999 (known as MPEG-4); and ITU-T Recommendation H.262 (ISO/IEC 13818-2) (known as MPEG-2). These standards define a hierarchy for bit-streams and correspondingly for image sequences and images.

To assist in error concealment, the MPEG-2 video coding standard allows for the transmission of motion vectors for INTRA macroblocks within INTRA pictures. These motion vectors are used only for error concealment, as follows: if an INTRA macroblock is lost (or corrupted), the decoder uses the motion vectors belonging to the macroblock above the lost one to get resembling blocks from a reference picture. If the INTRA macroblock does not contain motion information, the decoder conceals the errors with a spatial algorithm.

In H.263, the syntax has a hierarchical structure with four layers: picture, picture segment, macroblock, and block layer. The picture layer data contain parameters affecting the whole picture area and the decoding of the picture data. Most of this data is arranged in a so-called picture header.

The picture segment layer can either be a group of blocks layer or a slice layer. By default, each picture is divided into groups of blocks. A group of blocks (GOB) typically comprises 16 successive pixel lines. Data for each GOB consists of an optional GOB header followed by data for macroblocks. If the optional slice structured mode is used, each picture is divided into slices instead of GOBs. A slice contains a number of successive macroblocks in scan-order. Data for each slice consists of a slice header followed by data for the macroblocks.

Each GOB or slice is divided into macroblocks. A macroblock relates to 16×16 pixels (or 2×2 blocks) of luminance and the spatially corresponding 8×8 pixels (or block) of chrominance components. A block relates to 8×8 pixels of luminance or chrominance.

Block layer data consist of uniformly quantised discrete cosine transform coefficients, which are scanned in zigzag order, processed with a run-length encoder and coded with variable length codes. MPEG-2 and MPEG-4 layer hierarchies resemble that used in H.263.

In H.263, the issue of error concealment is typically perceived as a post-processing function and is generally left to the decoder. In ITU-T Study Group 16 Question 15 documents no. 17, 18, 19, 20, 21 & 22, presented at the Ninth meeting of ITU-T Study Group 16 in New Jersey in the USA in October 1999, it is proposed to add normative language to H.263 to specify several error concealment techniques and to define a signalling mechanism by which an encoder can announce this to a decoder, preferably on a picture-by-picture basis.

However this approach is unduly restrictive on the decoder since the error concealment method to be used by the decoder is specified by the encoder. Thus other concealment methods cannot be used, even if the decoder has these methods available to use.

SUMMARY OF THE INVENTION

According to a first aspect of the invention there is provided a method of encoding a video signal representing a sequence of pictures, the method comprising comparing a first picture with a second picture, calculating a measure of the similarity between the first and the second pictures, comparing the measure of similarity with a predetermined criterion of similarity and, when the measure of similarity does not meet the predetermined criterion of similarity, outputting an indicator indicating that a non-temporally predictive error concealment method should be used by a subsequent decoder and, when the measure of similarity meets the predetermined criterion of similarity, outputting an indicator indicating that a temporally predictive error concealment method should be used by a subsequent decoder.

Consequently, the decoder is free to choose an appropriate type of error concealment method for a corrupted picture on the basis of the indicator.

However the indicator does not specify a particular algorithm and thus the decoder is not restricted to using a particular algorithm.

Preferably the error concealment indicator is updated when the measure of similarity does not meet the predetermined criterion. The indicator then indicates what may be viewed as a change in scene.

Thus the invention enables the decoder to detect which pictures belong to the same scene and, on the basis of this indication, to select an appropriate type of error concealment method, if required. Thus, when the error concealment indicator changes from one frame to another, the decoder responds by applying a non-predictive error concealment method. If the error concealment indicator is the same from one frame to another, responds by applying a temporally predictive error concealment method.

For example, at a scene change, the similarity between the current picture (the first picture in a new scene) and the last picture of the previous scene will be low. The encoder will therefore update the error concealment indicator for the current picture. If the picture is corrupted, the decoder detects the change in the error concealment indicator and uses a non-temporally predictive concealment method. Additionally the decoder can determine which INTRA pictures are used to code a scene change and which ones are inserted into the video sequence for other reasons and can select an appropriate concealment algorithm on the basis of this information.

Some video encoders code all frames (after the initial frame) as INTER pictures. If the first INTER picture after a scene cut gets corrupted, a traditional decoder is likely to utilise temporal prediction in an attempt to conceal the errors introduced by loss of an INTER picture. Consequently, the contents of two pictures from different scenes are mixed and the concealed picture may be unacceptably distorted. However a decoder according to the invention is able to detect on the basis of the error concealment indicator that it should use a non-temporal concealment method instead of a temporal concealment method. Hence a picture from a different scene is not used for error concealment.

Compared with the solution introduced in MPEG-2, which requires additional motion rectors, the invention requires considerably fewer bits per frame. In addition, the invention operates with existing video compression standards that do not allow motion vectors for INTRA macroblocks, as allowed in MPEG-2.

The error concealment indicator may be included in respect of the whole picture or part of a picture. In the former case, typically the indicator is included in a picture header. In a preferred implementation of the invention, the video signal is encoded according to the H.263 standard and the error concealment indicator is included in the Supplemental Enhancement Information. In the latter case the error concealment indicator may also be included in picture segment headers or macroblock headers of the encoded picture.

According to a second aspect of the invention there is provided a method of encoding a video signal representing a sequence of pictures, the method comprising comparing a first picture with a second picture, calculating a measure of the similarity between the first and the second pictures, comparing the measure of similarity with a predetermined criterion of similarity and outputting an indicator in response to the measure of similarity wherein, when the measure of similarity does not meet the predetermined criterion, the indicator is updated and when the measure of similarity meets the predetermined criterion, the indicator is unchanged.

According to a third aspect of the invention there is provided a method of decoding an encoded video signal representing a sequence of pictures, the method comprising receiving an encoded video signal, identifying for each picture to be decoded an indicator indicating the type of concealment method to be used in the decoding process and decoding the encoded video signal using a concealment method of the identified type.

According to a fourth aspect of the invention there is provided a method of error concealment comprising receiving an encoded video signal including an indicator indicating the type of concealment method to be used in the error concealment process and concealing the error in the video signal appropriately.

According to a fifth aspect of the invention there is provided a method of decoding an encoded video signal representing a sequence of pictures, the method comprising receiving an encoded video signal, identifying for each picture to he decoded an indicator representing the measure of similarity between a first picture and a second picture and, when the indicator is the same as that of a previously received picture, applying a temporal predictive error concealment method and, when the indicator is the different from that of a previously received picture, applying a spatial error concealment method.

According to a sixth aspect of the invention there is provided a video encoder comprising an input for receiving a video signal representing a sequence of pictures, a calculator to calculate a measure of the similarity between a first and a second picture, and a comparator to compare the measure of similarity with a predetermined criterion of similarity and to output an indicator indicating the concealment method to be used by a subsequent decoder, the comparator being arranged to output an indicator indicating that a non-temporally predictive concealment method should be used when the measure of similarity does not meet the predetermined criterion, and, when the measure of similarity meets the predetermined criterion, to output an indicator indicating that a temporally predictive concealment method should be used by a subsequent decoder.

According to a seventh aspect of the invention there is provided a video encoder for encoding a video signal representing a sequence of pictures, the encoder comprising a comparator for comparing a first picture with a second picture, a processor for calculating a measure of the similarity between the first and the second pictures and comparing the measure of similarity with a predetermined criterion of similarity, the processor being arranged to output an indicator in response to the measure of similarity wherein, when the measure of similarity does not meet the predetermined criterion, the indicator is updated and when the measure of similarity meets the predetermined criterion, the indicator is unchanged.

According to an eighth aspect of the invention there is provided a video decoder comprising an input for receiving an encoded video signal representing a sequence of pictures, a controller for identifying within the video signal for each picture to be decoded an indicator indicating the type of concealment method to be used in the decoding process, and decoding the encoded video signal using a concealment method as indicated by the indicator.

BRIEF DESCRIPTION OF THE DRAWINGS

The invention will now be described, by way of example only, with reference to the accompanying drawings, in which:

FIG. 4 shows the syntax of a bit stream as known according to H.263;

FIG. 5a shows an example of a bit stream output by an encoder according to a first implementation of the invention;

FIG. 5b shows an example of a bit stream output by an encoder according to a second implementation of the invention;

FIG. 6a shows an example of a bit stream output by an encoder according to a third implementation of the invention;

FIG. 6b shows an example of a bit stream output by an encoder according to a fourth implementation of the invention;

FIG. 7 shows an example of a bit stream output by an encoder according to a fifth implementation of the invention.

DETAILED DESCRIPTION OF THE INVENTION

Figure 1:
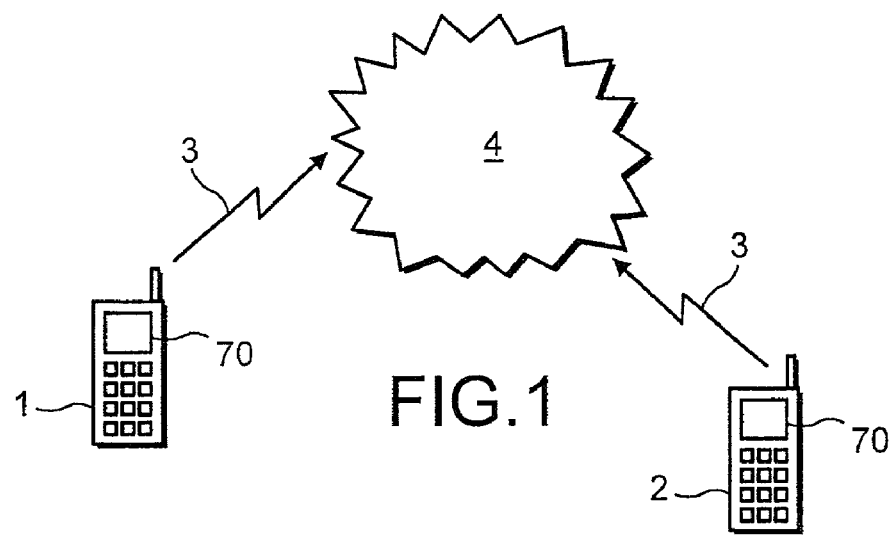
FIG. 1 shows a multimedia mobile communications system.

FIG. 1 shows a typical multimedia mobile communications system. A first multimedia mobile terminal 1 communicates with a second multimedia mobile terminal 2 via a radio link 3 to a mobile communications network 4. Control data is sent between the two terminals 1,2 as well as the multimedia data.

Figure 2:
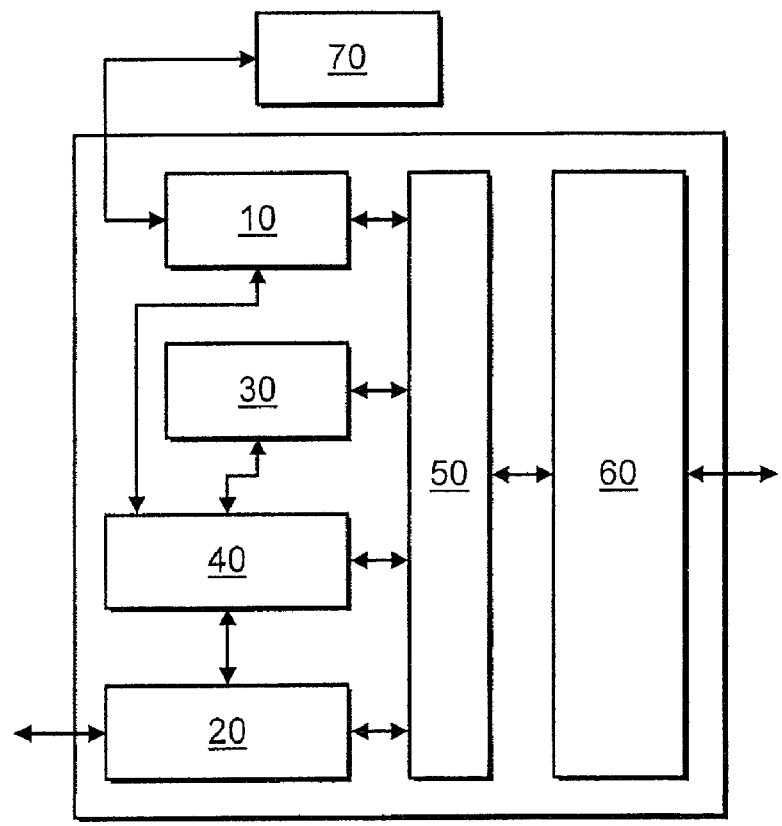
FIG. 2 shows an example of the multimedia components of a multimedia terminal.

FIG. 2 shows the typical multimedia components of a terminal 1. The terminal comprises a video codec 10, an audio codec 20, a data protocol manager 30, a control manager 40, a multiplexer/demultiplexer 50 and a modem 60 (if required). The video codec 10 receives signals for coding from a video capture device of the terminal (not shown) (e.g. a camera) and receives signals for decoding from a remote terminal 2 for display by the terminal 1 on a display 70. The audio codec 20 receives signals for coding from the microphone (not shown) of the terminal 1 and receive signals for decoding from a remote terminal 2 for reproduction by a speaker (not shown) of the terminal 1.

The control manager 40 controls the operation of the video codec 10, the audio codec 20 and the data protocol manager 30. However, since the invention is concerned with the operation of the video codec 10, no further discussion of the audio codec 20 and protocol manager 30 will be provided.

Figure 3:
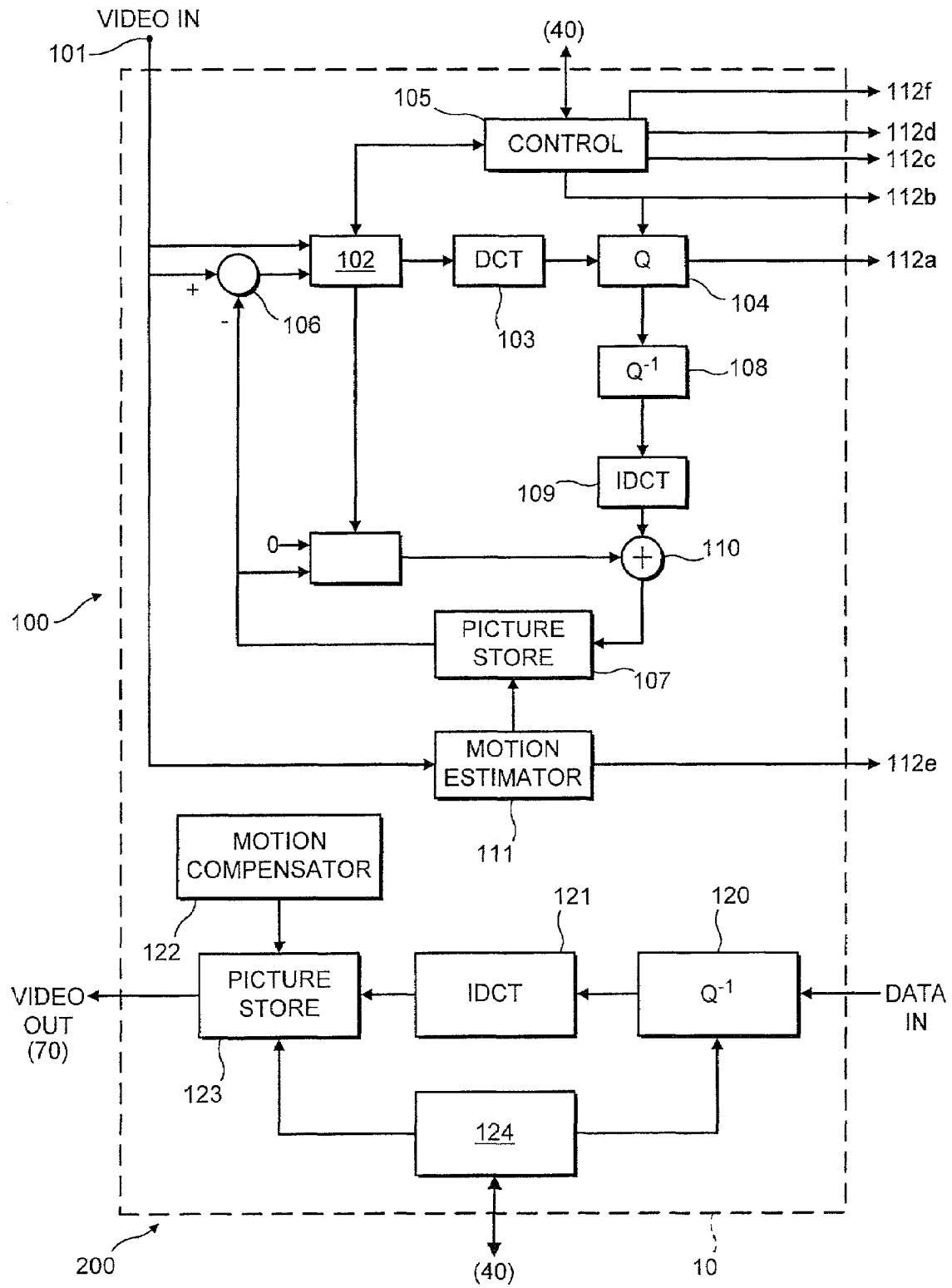
FIG. 3 shows an example of a video codec.

FIG. 3 shows an example of a video codec 10 according to the invention. The video codec comprises an encoder part 100 and a decoder part 200. The encoder part 100 comprises an input 101 for receiving a video signal from a camera or video source (not shown) of the terminal 1. A switch 102 switches the encoder between an INTRA-mode of coding and an INTER-mode.

In INTRA-mode, the video signal from the input 101 is transformed into DCT co-efficients by a DCT transformer 103. The DCT coefficients are then passed to a quantiser 104 that quantises the coefficients. Both the switch 102 and the quantiser 104 are controlled by an encoding control manager 105 of the video codec which also receives feedback control from the receiving terminal 2 by means of the control manager 40.

In INTER mode, the switch 102 is operated to accept from a subtractor 106 the difference between the signal from the input 101 and a previous picture which is stored in a picture store 107. The difference data output from the subtractor 106 represents the prediction error between the current picture and the previous picture stored in the picture store 107. The data in the picture store 107 is generated by passing the data output by the quantiser through an inverse quantiser 108 and applying an inverse DCT transform 109 to the inverse-quantised data. The resulting data is added to the contents of the picture store 107 by adder 110. A motion estimator 111 may generate motion compensation data (motion vectors) from the data in the picture store 107 in a conventional manner.

The video codec outputs the quantised DCT coefficients 112a, the quantising index 112b (i.e. the details of the quantising used), an INTRA/INTER flag 112c to indicate the mode of coding performed (I or P/B), a transmit flag 112d to indicate the number of the frame being coded and the motion vectors 112e for the picture being coded. These are multiplexed together by the multiplexer 50 together with other multimedia signals.

The decoder part 200 of the video codec 10 comprises an inverse quantiser 120, an inverse DCT transformer 121, a motion compensator 122, a picture store 123 and a controller 124. The controller 124 receives video codec control signals demultiplexed from the encoded multimedia stream by the demultiplexer 50. In practice the controller 105 of the encoder and the controller 124 of the decoder may be the same processor.

The operation of an encoder according to the invention will now be described. The video codec 10 receives a video signal to be encoded. The encoder 100 of the video codec encodes the video signal by performing DCT transformation, quantisation and motion compensation. The decoded video data is then output to the multiplexer 50. The multiplexer 50 multiplexes the video data from the video codec 10 and control data from the control 40 (as well as other signals as appropriate) into a multimedia signal. The terminal 1 outputs this multimedia signal to the receiving terminal 2 via the modem 60 (if required).

The invention relates to the inclusion of an indicator in the video sequence syntax that indicates the type of concealment method to be used by the decoder. This may be included in the picture layer of the bit stream or be provided as a separate layer. The indicator may enable identification of different scenes and thus the type of concealment method to be used.

In a first embodiment of the invention, the error concealment indicator comprises a so-called scene identifier (SI), which is added to the bit-stream representation of each coded picture. The scene identifier is a value, which is the same for all of the pictures of the same scene. Pictures belonging to different scenes typically have different scene identifiers. Preferably, the value of SI is incremented each time it is updated. However, it is envisaged that the scene identifier may take one of two values, with pictures from adjacent scenes having non-identical SI values e.g. the pictures of the odd-numbered scenes having SI set to 0 and the pictures of the even-numbered scenes having SI set to 1.

The controller 105 of the encoder detects a scene cut by comparing the similarity between one frame and another. The controller 105 compares the pixel representation of the current picture (received from input 102) with the pixel representation of the previous picture stored in the picture store 107. Each time the similarity between the two pictures is below a certain threshold, the controller detects a scene cut and an updated scene indicator 112f is output. If the similarity is above the threshold the scene indicator is not updated but is repeated.

The scene identifier does not necessarily identify an actual scene cut; a change in the scene identifier indicates that the current picture has changed sufficiently with respect to a previous picture that the current picture may be deemed to be a new scene.

Other known methods for detecting scene changes may be used.

In a second embodiment of the invention, a so-called concealment method indicator (CMI) is added to the bit-stream representation of each coded picture. The CMI indicates to a decoder the type of concealment method that the decoder should use if the associated picture is corrupted. The encoder decides which CMI to associate with the picture by comparing the similarity between a current picture and a previous one. If the similarity between the two pictures is below a certain threshold, the controller outputs a first concealment method indicator CMI=0 as output 112f. This indicates to a decoder that a non-temporal predictive concealment method should be used. If the similarity is above the threshold a second concealment method indicator CMI=1 is output as output 112f. This indicates to a decoder that a temporal predictive concealment method should be used.

The measure of similarity may be formed by calculating the mathematical correlation between the two pictures.

An error concealment indicator may also be included in the picture segment header and/or the macroblock header to influence at this level the selection by a receiving decoder of an appropriate error concealment method.

Considering the terminal 1 as receiving encoded video data from terminal 2, the operation of the video codec 10 will now be described with reference to its decoding role. The terminal 1 receives a multimedia signal from the transmitting terminal 2. The demultiplexer 50 demultiplexes the multimedia signal and passes the video data to the video codec 10 and the control data to the control manager 40. The decoder 200 of the video codec decodes the encoded video data by inverse quantising, inverse DCT transforming and motion compensating the data. The controller 124 of the decoder checks the integrity of the received data and, if an error is detected, attempts to correct and conceal the error in a manner to be described below. The decoded, corrected and concealed video data is then output for reproduction on a display 70 of the receiving terminal 1.

Errors in video data may occur at the picture level, the picture segment level or the macroblock level. Error checking may be carried out at any or all of these levels.

Considering first a signal encoded according to the invention, in which an indicator SI is included, when an error is detected, the decoder examines the SI of the received but corrupted picture. If the SI of the corrupted picture is the same as that of the temporally-neighbouring correctly decoded picture(s), the decoder applies a temporal prediction (INTER) concealment algorithm. The decoder may be capable of carrying out various temporal prediction concealment algorithms. The indicator SI indicates to the decoder the type of concealment algorithm that should be used but does not specify the algorithm to be used.

If the SI of the corrupted picture differs from that of the temporally-neighbouring correctly decoded picture(s), the decoder conceals the picture using a spatial (INTRA) concealment method.

Considering a signal encoded according to the invention, in which an indicator CMI is included, when an error is detected, the decoder examines the CMI of the received but corrupted picture. If the CMI of the corrupted picture is CMI1, the decoder conceals the picture using a spatial concealment method. If the CMI of the corrupted picture is CMI2, the decoder applies a temporal prediction concealment algorithm. Again the decoder may be capable of carrying out various error concealment algorithms. The indicator CMI indicates to the decoder the type of concealment method that should be used but does not specify the algorithm to be used.

An example of how the error concealment indicator may be included in the syntax of an encoded signal will now be addressed with reference to the H.263 video coding standard.

FIG. 4 shows the syntax of a bit stream as known according to H.263. (The following implementations describe the GOB format but it will be clear to a skilled person that the invention may also be implemented in the slice format.) As mentioned already, the bit stream has four layers: the picture layer, picture segment layer, macroblock layer and block layer. The picture layer comprises a picture header followed by data for the Group of Blocks, eventually followed by any optional end-of-sequence code and stuffing bits.

The prior art H.263 bit stream is formatted as shown in FIG. 4. A descriptor for each part is given below:

PSC The picture start code (PSC) indicates the start of the picture
TR The Temporal Reference (TR) is formed by incrementing its value in the temporally previous reference picture header by one plus the number of skipped or non-referenced pictures since the previously transmitted one
PTYPE Amongst other things, PTYPE includes details of the picture coding type i.e. INTRA or INTER
PQUANT A codeword that indicates the quantiser to be used for the picture until updated by any subsequent quantiser information
CPM A codeword that signals the use of optional continuous presence multipoint and video multiplex (CPM) mode
PSBI Picture Sub-Bit stream Indicator—only present if CPM is set
$TR_B$ Present if the frame is a bi-directionally predicted frame (known as a PB-frame)
DBQUANT Present if a bi-directional frame
PEI This relates to extra insertion information and is set to "1" to indicate the presence of the following optional data fields PSUPP and PEI. PSUPP and PEI are together known as Supplemental Enhancement Information, which is further defined in Annex L of H.263.
GOBS Is the data for the group of blocks for the current picture
ESTF A stuffing codeword provided to attain byte alignment before EOS
EOS A codeword indicating the end of the data sequence for the picture
PSTUF A stuffing codeword to allow for byte alignment of the next picture start code PSC The structure as shown in FIG. 4 does not include the optional PLUSTYPE data field. PSBI is only present if indicated by CPM. $TR_B$ and DBQUANT are only present if PTYPE indicates use of a so-called PB frame mode (unless the PLUSTYPE field is present and the used of DBQUANT is indicated therein). These issues are addressed in more detail in the H.263 specification.

The following paragraphs outline possible implementations of the bit-stream output by an encoder according to the invention.

The concealment method indicator may be incorporated into a H.263 bit stream as follows. FIG. 5a shows an example of a bit stream output by an encoder according to the first implementation of the invention. As shown in FIG. 5a, the bit stream includes an additional codeword SI which is a codeword indicating the scene to which the picture belongs. This is inserted by the encoder according to the amount of change between successive pictures, as described above. A change in identifier indicates that the similarity between the picture being coded and a reference picture is low. The decoder uses this information to select an error concealment method of the indicated type. In this case, the type of error concealment method to be used is not specifically indicated, but can be determined from the changes in SI.

FIG. 5b shows an example of a bit stream output by an encoder according to the second implementation of the invention. As shown in FIG. 5b, the bit stream may include an additional codeword CMI which is a codeword indicating the type of concealment method to be used by the decoder. This is inserted by the encoder according to the amount of change between successive pictures, as described above.

Alternatively, the SI or CMI may be included in the Supplemental Enhancement Information PSUPP (see Annex L of H.263 and FIG. 4). The supplemental information may be present in the bit stream even though the decoder may not be capable of providing the enhanced capability to use it, or even to properly interpret it. Simply discarding the supplemental information is allowable by decoders unless a requirement to provide the requested capability has been negotiated by external means.

If PEI is set to "1", then 9 bits follow consisting of 8 bits of data (PSUPP) and then another PEI bit to indicate if a further 9 bits follow and so on.

The PSUPP data consists of a 4-bit function type indication FTYPE, followed by a 4-bit parameter data size specification DSIZE followed by DSIZE octets of function parameter data, optionally followed by another FTYPE and so on. It is known to use this PSUPP codeword to signal various situations such as: to indicate a full-picture or partial-picture freeze or freeze-release request with or without resizing; to tag particular pictures or sequences of pictures within the video stream for external use; or to convey chroma key information for video compositing.

To implement the invention using the Supplemental Enhancement Information, a further FTYPE is defined as "Scene Identifier" or "CMI". For example, FTYPE 15 may be used for this purpose.

This is illustrated in FIGS. 6a and 6b. FIG. 6a illustrates the example where a parameter SI is included in the SEI of the picture header. The FTYPE is defined as Scene Identifier SI. The DSIZE specifies the size of the parameter and the following octet is the parameter data i.e. the value of SI. From this value a receiving decoder can determine whether a corrupted picture is from the same "scene" as a previous one and so select the most appropriate type of concealment method. FIG. 6b illustrates the example where a parameter CMI is included in the SEI of the picture header. The FTYPE is defined as Concealment Method Indicator CMI. The DSIZE specifies the size of the parameter and the following octet is the parameter data i.e. the value of CMI. From this value a receiving decoder can determine the most appropriate type of concealment method for a corrupted picture.

Alternatively, the information may be contained in the additional Supplemental Enhancement Information as specified in a "Draft of new Annex W: Additional Supplementary Enhancement Information Specification" P. Ning and S. Wenger, ITU-T Study Group 16 Question 15 Document Q15-I-58, November 1999.

In this draft proposal, FTYPE 14 is defined as "Picture Message". When this FTYPE is set, the picture message function indicates the presence of one or more octets representing message data. The first octet of the message data is a message header with the structure shown in FIG. 7 i.e. CONT, EBIT and MTYPE. DSIZE is equal to the number of octets in the message data corresponding to a picture message function, including the first octet message header.

The continuation field CONT, if equal to 1, indicates that the message data associated with the picture message is part of the same logical message as the message data associated with the next picture message function. The End Bit Position field EBIT specifies the number of least significant bits that shall be ignored in the last message octet. Further details of these fields can be found in the draft of Annex W, referred to above.

The field MTYPE indicates the type of message. Various types of message are suggested in the draft of Annex W. According to the invention one type e.g. MTYPE 9 is defined as Error Concealment Type. The value of the scene identifier or CMI is defined in the octet following the message header. For the scene identifier the value is the same in all pictures of the same scene. Pictures belonging to different scenes have different scene identifier values. The decoder uses the SI or CMI to determine the type of error concealment to be used.

The message may also indicate the type of error concealment that should be used for particular specified rectangular areas of the current picture if at least part of the area is not correctly received. There may be multiple error concealment type messages for one picture each specifying the concealment type for a non-overlapping rectangular area. Advantageously if the messages do not cover some areas of the picture, a decoder uses any error concealment for those areas. Preferably, the decoder uses the concealment type that corresponds to the picture type i.e. a temporal predictive concealment method for an INTER-frame and a non-temporal predictive concealment method for an INTRA-frame.

A specific example will now be given. For each error concealment type message, DSIZE shall be 6, CONT shall be 0, and EBIT shall be 0. If the first data byte is equal to one (0000 0001), this indicates to a decoder that transmission errors are to be concealed using spatial concealment algorithms only. If the first data byte is equal to two (0000 0010), this indicates to a decoder that transmission errors are to be concealed using temporal prediction. The following four PSUPP octets contain the horizontal and vertical location of the upper left corner of the specified rectangular region within the picture within which errors are to be concealed, and the width and height of the rectangular region, respectively, using eight bits each and expressed in units of 16 pixels (of luminance picture). For example, an entire Quarter Common Intermediate Format (QCIF) picture (which has a luminance picture of 176×144 pixels) is specified by the four parameters (0, 0, 11, 9).

For picture formats having a width and height that is not divisible by 16, the specified area may extend to the next larger size that would be divisible by 16. For example, an entire image having size of 160×120 pixels is specified by the four parameters (0, 0, 10, 8). Preferably, the specified area does not cross picture boundaries, and preferably does not overlap with other specified error concealment areas of the same picture.

The error concealment indicator may also be incorporated into other video coding protocols. For example MPEG-4 defines so-called user data, which can contain any binary data and is not necessarily associated with a picture. The error concealment identifier may be added to these fields.

The invention is not intended to be limited to the video coding protocols discussed above: these are intended to be merely exemplary. The invention is applicable to any video coding protocol in which a choice of error concealment methods is available. The addition of the information as discussed above allows a receiving decoder to determine which would be the best type of error concealment method to use.

What is claimed is:

1. A method of encoding a video signal representing a sequence of pictures to form an encoded video signal, the method comprising:
generating an error concealment algorithm type indicator for a picture or a part thereof, the error concealment algorithm type indicator for providing an indication of a type of error concealment algorithm, said indication to be used as the basis for choosing, in a corresponding decoding process, a particular error concealment algorithm of the type indicated available to the corresponding decoding process; and
providing the error concealment algorithm type indicator for use in the corresponding decoding process separate from an indication of an encoding mode for the picture.

2. A method according to claim 1, comprising generating the error concealment algorithm type indicator to indicate either a temporally-predictive or a non-temporally-predictive type of error concealment algorithm.

3. A method according to claim 1, comprising generating the error concealment algorithm type indicator by:
comparing a first picture of the sequence or a part thereof with a second picture of the sequence;
calculating a measure of similarity between the first picture or said part thereof and said second picture; and
comparing the measure of similarity with a predetermined criterion of similarity.

4. A method according to claim 2, comprising generating the error concealment algorithm type indicator by:
comparing a first picture of the sequence or a part thereof with a second picture of the sequence;
calculating a measure of similarity between the first picture or said part thereof and said second picture; and
comparing the measure of similarity with a predetermined criterion of similarity.

5. A method according to claim 4, comprising:
generating the error concealment algorithm type indicator to indicate that a non-temporally-predictive error concealment algorithm should be used in the corresponding decoding process for the first picture or said part thereof, when the measure of similarity does not meet the predetermined criterion of similarity; and,
generating the error concealment algorithm type indicator to indicate that a temporally-predictive error concealment algorithm should be used in the corresponding decoding process for the first picture or said part thereof when the measure of similarity meets the predetermined criterion of similarity.

6. A method according to claim 5, comprising updating the error concealment algorithm type indicator when the measure of similarity does not meet the predetermined criterion of similarity.

7. A method according to claim 5, comprising including the error concealment algorithm type indicator in a picture header.

8. A method according to claim 5, comprising encoding the video signal according to the H.263 standard and including the error concealment algorithm type indicator in the Supplemental Enhancement Information of the standard.

9. A method according to claim 5, comprising updating the error concealment algorithm type indicator when the measure of similarity does not meet the predetermined criterion of similarity, and leaving the error concealment algorithm type indicator unchanged when the measure of similarity meets the predetermined criterion of similarity.

10. A method according to claim 5, comprising using a scene identifier as the error concealment algorithm type indicator, the scene identifier having the same value for all pictures of a scene, the scene identifier having a different value for each different scene.

11. A method according to claim 5, comprising using a scene identifier as the error concealment algorithm type indicator, the scene identifier having one of two values, with pictures from adjacent scenes having non-identical scene identifier values.

12. A method according to claim 5, comprising including the error concealment algorithm type indicator in a picture segment header and/or a macroblock header.

13. A method according to claim 5, comprising generating the error concealment algorithm type indicator to indicate a type of error concealment algorithm to be applied to a specified rectangular area of a picture.

14. A method according to claim 13, comprising generating multiple error concealment algorithm type indicators for a picture, each error concealment algorithm type indicator being specific to one of a plurality of non-overlapping rectangular areas of the picture.

15. A method of decoding an encoded video signal representing a sequence of pictures, the method comprising:
receiving an error concealment algorithm type indicator for a picture or a part thereof, the error concealment algorithm type indicator being separate from an indication of an encoding mode for the picture;
using the received error concealment algorithm type indicator as the basis for choosing a particular error concealment algorithm of the type indicated; and
applying the chosen error concealment algorithm to conceal an error in the picture or said part thereof 16. A method according to claim 15, comprising using the error concealment algorithm type indicator as an indication of either a temporally-predictive or a non-temporally-predictive type of error concealment algorithm.

17. A method according to claim 16, comprising obtaining the error concealment algorithm type indicator from a picture header.

18. A method according to claim 16, comprising receiving a video signal encoded according to the H.263 standard, decoding the encoded video signal according to the H.263 standard and obtaining the error concealment algorithm type indicator from the Supplemental Enhancement Information of the standard.

19. A method according to claim 16, comprising using a scene identifier as the error concealment algorithm type indicator, the scene identifier having the same value for all pictures of a scene, the scene identifier having a different value for each different scene.

20. A method according to claim 16, comprising using a scene identifier as the error concealment algorithm type indicator, the scene identifier having one of two values, with pictures from adjacent scenes having non-identical scene identifier values.

21. A method according to claim 16, comprising obtaining the error concealment algorithm type indicator from a picture segment header or a macroblock header.

22. A method according to claim 16, comprising using the error concealment algorithm type indicator as an indication of a type of error concealment algorithm to be applied to a specified rectangular area of a picture.

23. A method according to claim 22, comprising receiving multiple error concealment algorithm type indicators for a picture, each error concealment algorithm type indicator being specific to one of a plurality of non-overlapping rectangular areas of the picture and correspondingly applying a respective error concealment algorithm.

24. A method according to claim 19, comprising comparing a scene identifier for a picture with a scene identifier for a temporally neighboring correctly decoded picture and applying a temporally-predictive error concealment algorithm in the decoding process for the picture when the scene identifier for the picture is the same as the scene identifier for the temporally neighboring correctly decoded picture.

25. A method according to claim 20, comprising comparing a scene identifier for a picture with a scene identifier for a temporally neighboring correctly decoded picture and, applying a temporally-predictive error concealment algorithm in the decoding process for the picture when the scene identifier for the picture is the same as the scene identifier for the temporally neighboring correctly decoded picture.

26. A method according to claim 19, comprising comparing a scene identifier for a picture with a scene identifier for a temporally neighboring correctly decoded picture and, applying a non-temporally-predictive error concealment algorithm in the decoding process for the picture when the scene identifier for the picture is different from the scene identifier for the temporally neighboring correctly decoded picture.

27. A method according to claim 20, comprising comparing a scene identifier for a picture with a scene identifier for a temporally neighboring correctly decoded picture and applying a non-temporallv-predictive error concealment algorithm in the decoding process for the picture when the scene identifier for the picture is different from the scene identifier for the temporally neighboring correctly decoded picture.

28. An apparatus for encoding a video signal representing a sequence of pictures to form an encoded video signal, the apparatus being configured to:
generate an error concealment algorithm type indicator for a picture or a part thereof, the error concealment algorithm type indicator for providing an indication of a type of error concealment algorithm, said indication to be used as the basis for choosing, in a corresponding decoding process, a particular error concealment algorithm of the type indicated available to the corresponding decoding process; and
provide the error concealment algorithm type indicator for use in the corresponding decoding process separate from an indication of an encoding mode for the picture.

29. An apparatus according to claim 28, wherein the apparatus is configured to generate the error concealment algorithm type indicator to indicate either a temporally-predictive or a non-temporally-predictive type of error concealment algorithm.

30. An apparatus according to claim 28, wherein the apparatus is configured to generate the error concealment algorithm type indicator by:
comparing a first picture of the sequence or a part thereof with a second picture of the sequence;
calculating a measure of similarity between the first picture or said part thereof and said second picture; and
comparing the measure of similarity with a predetermined criterion of similarity.

31. An apparatus according to claim 29, wherein the apparatus is configured to generate the error concealment algorithm type indicator by:
comparing a first picture of the sequence or a part thereof with a second picture of the sequence;
calculating a measure of similarity between the first picture or said part thereof and said second picture; and
comparing the measure of similarity with a predetermined criterion of similarity.

32. An apparatus according to claim 31, wherein the apparatus is configured to:

generate the error concealment algorithm type indicator to indicate that a non-temporally-predictive error concealment algorithm should be used in the corresponding decoding process for the first picture or said part thereof when the measure of similarity does not meet the predetermined criterion of similarity; and generate the error concealment algorithm type indicator to indicate that a temporally-predictive error concealment algorithm should be used in the corresponding decoding process for the first picture or said part thereof when the measure of similarity meets the predetermined criterion of similarity.

33. An apparatus according to claim 32, wherein the apparatus is configured to update the error concealment algorithm type indicator when the measure of similarity does not meet the predetermined criterion of similarity.

34. An apparatus according to claim 32, wherein the apparatus is configured to include the error concealment algorithm type indicator in a picture header.

35. An apparatus according to claim 32, wherein the apparatus is configured to encode the video signal according to the H.263 standard and to include the error concealment algorithm type indicator in the Supplemental Enhancement Information of the standard.

36. An apparatus according to claim 32, wherein the apparatus is configured to use a scene identifier as the error concealment algorithm type indicator, the scene identifier having the same value for all pictures of a scene, the scene identifier having a different value for each different scene.

37. An apparatus according to claim 32, wherein the apparatus is configured to use a scene identifier as the error concealment algorithm type indicator, the scene identifier having one of two values, with pictures from adjacent scenes having non-identical scene identifier values.

38. An apparatus according to claim 32, wherein the apparatus is configured to include the error concealment algorithm type indicator in a picture segment header and/or a macroblock header.

39. An apparatus according to claim 32, wherein the apparatus is configured to generate the error concealment algorithm type indicator to indicate a type of error concealment algorithm to be applied to a specified rectangular area of a picture.

40. An apparatus according to claim 39, wherein the apparatus is configured to provide multiple error concealment algorithm type indicators for a picture, each error concealment algorithm type indicator being specific to one of a plurality of non-overlapping rectangular areas of the picture.

41. An apparatus according to claim 32, wherein the apparatus is configured to update the error concealment algorithm type indicator when the measure of similarity does not meet the predetermined criterion of similarity, and to leave the error concealment algorithm type indicator unchanged when the measure of similarity meets the predetermined criterion of similarity.

42. An apparatus for decoding an encoded video signal representing a sequence of pictures, the apparatus being configured to:

receive an error concealment algorithm type indicator for a picture or a part thereof, the error concealment algorithm type indicator being separate from an indication of an encoding mode for the picture;

use the received error concealment algorithm type indicator as the basis for choosing a particular error concealment algorithm of the type indicated; and apply the chosen error concealment algorithm to conceal an error in the picture or said part thereof.

43. An apparatus according to claim 42, wherein the apparatus is configured to use the error concealment algorithm type indicator as an indication of either a temporally-predictive or a non-temporally-predictive type of error concealment algorithm.

44. An apparatus according to claim 43, wherein the apparatus is configured to obtain the error concealment algorithm type indicator from a picture header.

45. An apparatus according to claim 43, wherein the apparatus is configured to receive a video signal encoded according to the H.263 standard, decode the encoded video signal according to the H.263 standard and obtain the error concealment algorithm type indicator from the Supplemental Enhancement Information of the standard.

46. An apparatus according to claim 43, wherein the apparatus is configured to use a scene identifier as the error concealment algorithm type indicator, the scene identifier having the same value for all pictures of a scene, the scene identifier having a different value for each different scene.

47. An apparatus according to claim 43, wherein the apparatus is configured to use a scene identifier as the error concealment algorithm type indicator, the scene identifier having one of two values, with pictures from adjacent scenes having non-identical scene identifier values.

48. An apparatus according to claim 43, wherein the apparatus is configured to obtain the error concealment algorithm type indicator from a picture segment header or a macroblock header.

49. An apparatus according to claim 43, wherein the apparatus is configured to use the error concealment algorithm type indicator as an indication of a type of error concealment algorithm to be applied to a specified rectangular area of a picture.

50. An apparatus according to claim 49, wherein the apparatus is configured to receive multiple error concealment algorithm type indicators for a picture, each error concealment algorithm type indicator being specific to one of a plurality of non-overlapping rectangular areas of the picture and to correspondingly apply a respective error concealment algorithm.

51. An apparatus according to claim 46, wherein the apparatus is configured to compare a scene identifier for a picture with a scene identifier for a temporally neighboring correctly decoded picture and apply a temporally-predictive error concealment algorithm in the decoding process for the picture when the scene identifier for the picture is the same as the scene identifier for the temporally neighboring correctly decoded picture.

52. An apparatus according to claim 47, wherein the apparatus is configured to compare a scene identifier for a picture with a scene identifier for a temporally neighboring correctly decoded picture and apply a temporally-predictive error concealment algorithm in the decoding process for the picture when the scene identifier for the picture is the same as the scene identifier for the temporally neighboring correctly decoded picture.

53. An apparatus according to claim 46, wherein the apparatus is configured to compare a scene identifier for a picture with a scene identifier for a temporally neighboring correctly decoded picture and apply a non-temporally-predictive error concealment algorithm in the decoding process for the picture when the scene identifier for the picture is different from the scene identifier for the temporally neighboring correctly decoded picture.

54. An apparatus according to claim 47, wherein the apparatus is configured to compare a scene identifier for a picture with a scene identifier for a temporally neighboring correctly decoded picture and apply a non-temporally-predictive error concealment algorithm in the decoding process for the picture when the scene identifier for the picture is different from the scene identifier for the temporally neighboring correctly decoded picture.

55. A portable radio communications device including at least one of an apparatus for encoding a video signal representing a sequence of pictures to form an encoded video signal and an apparatus for decoding an encoded video signal representing a sequence of pictures, the apparatus for encoding a video signal being configured to:

generate an error concealment algorithm type indicator for a picture or a part thereof, the error concealment algorithm type indicator for providing an indication of a type of error concealment algorithm, said indication to be used as the basis for choosing, in a corresponding decoding process, a particular error concealment algorithm of the type indicated available to the corresponding decoding process; and provide the error concealment algorithm type indicator for use in the corresponding decoding process separate from an indication of an encoding mode for the picture, and the apparatus for decoding an encoded video signal being configured to:

receive an error concealment algorithm type indicator for a picture or a part thereof, the error concealment algorithm type indicator being separate from an indication of an encoding mode for the picture;

use the received error concealment algorithm type indicator as the basis for choosing a particular error concealment algorithm of the type indicated; and apply the chosen error concealment algorithm to conceal an error in the picture or said part thereof.

56. An encoded video signal representing a sequence of pictures, the encoded video signal including an error concealment algorithm type indicator for a picture or a part thereof, the error concealment algorithm type indicator being separate from an indication of an encoding mode for the picture, and providing an indication of a type of error concealment algorithm to be used as the basis for choosing, in a corresponding decoding process, a particular error concealment algorithm of the type indicated available to the corresponding decoding process.

57. An apparatus for encoding a video signal representing a sequence of pictures to form an encoded video signal, the apparatus comprising:

means for generating an error concealment algorithm type indicator for a picture or a part thereof, the error concealment algorithm type indicator for providing an indication of a type of error concealment algorithm, said indication to be used as the basis for choosing, in a corresponding decoding process, a particular error concealment algorithm of the type indicated available to the corresponding decoding process; and means for providing the error concealment algorithm type indicator for use in the corresponding decoding process separate from an indication of an encoding mode for the picture.

58. An apparatus for decoding an encoded video signal representing a sequence of pictures, the apparatus comprising:

means for receiving an error concealment algorithm type indicator for a picture or a part thereof, the error concealment algorithm type indicator being separate from an indication of an encoding mode for the picture;

means for using the received error concealment algorithm type indicator as the basis for choosing a particular error concealment algorithm of the type indicated; and means for applying the chosen error concealment algorithm to conceal an error in the picture or said part thereof.

59. An apparatus for encoding a video signal representing a sequence of pictures to form an encoded video signal, the apparatus comprising one or more functional units for:

generating an error concealment algorithm type indicator for a picture or a part thereof, the error concealment algorithm type indicator for providing an indication of a type of error concealment algorithm, said indication to be used as the basis for choosing, in a corresponding decoding process, a particular error concealment algorithm of the type indicated available to the corresponding decoding process; and providing the error concealment algorithm type indicator for use in the corresponding decoding process separate from an indication of an encoding mode for the picture.

60. An apparatus for decoding an encoded video signal representing a sequence of pictures, the apparatus comprising one or more functional units for:

receiving an error concealment algorithm type indicator for a picture or a part thereof, the error concealment algorithm type indicator being separate from an indication of an encoding mode for the picture;

using the received error concealment algorithm type indicator as the basis for choosing a particular error concealment algorithm of the type indicated; and applying the chosen error concealment algorithm to conceal an error in the picture or said part thereof.

* * * * *